Aug. 6, 1968   E. J. SKIERSKI   3,395,603
ROTARY THREADED FASTENERS
Filed Sept. 13, 1966

Inventor:
Edwin J. Skierski
By his Attorney
Richard B. Megley

United States Patent Office 3,395,603
Patented Aug. 6, 1968

3,395,603
ROTARY THREADED FASTENERS
Edwin J. Skierski, Wayne, N.J., assignor to Parker-Kalon Corporation, Clifton, N.J., a corporation of Delaware
Filed Sept. 13, 1966, Ser. No. 579,036
7 Claims. (Cl. 85—47)

ABSTRACT OF THE DISCLOSURE

A drilling and thread forming screw comprising a trailing threaded shank and a pilot end. The pilot end has a transverse major axis and a transverse minor axis, the length of the major axis being substantially at least as great as the root diameter of the threaded shank and greater than that of the minor axis. A pair of flutes are formed in the pilot end each of which provides cutting surfaces essentially coterminal with the major axis and drag surfaces essentially coterminal with the minor axis. Lands intermediate the drag and cutting surfaces of sufficient size provide maximum reinforcement for the cutting surfaces without engaging a pilot hole cut by the cutting surfaces.

---

This invention relates to a rotary threaded fastener or screw having novel features which permit the screw to cut a pilot hole and swage threads therein without the need for any predrilling or the like.

Normal practice in forming cutting edges on the pilot end or entering portion of a screw is to machine grooves or slots, of a shape dictated by the particular design, in a screw blank without altering the shape of the resultant "land" portions intermediate the grooves. That is, the conventional circular cross-section screw blank generally has two cutting edges milled therein but the remaining portion of the circumference of the blank at the pilot end is left in an arcuate form corresponding in curvature and diameter to the main shank body. As a result, these "lands" or arcuate portions engage the member into which the screw is inserted during the cutting operation. This engagement increases the torque required to perform the cutting operation due to the frictional drag forces resulting from such engagement. The present invention provides an improved screw having a pilot end of esentially elliptical transverse configuration wherein the cutting edges define the major axis of the ellipse and the intermediate "lands" define the minor axis. With this improved construction, the "lands" do not engage a member in which a pilot hole is cut, thus minimizing the torque required for insertion.

As noted above, normal practice has been to machine the cutting edges in the pilot end of the screw blank. This is a relatively costly operation. Dies are employed to pinch or punch the cutting edges in screws of the present invention. The novel method which permits this practice and the unique dies used in the method provide a relatively inexpensive means of manufacturing screws of this type at a production rate heretofore impossible.

Accordingly, it is an object of this invention to provide a rotary threaded fastener of beneficial and novel construction comprising a pilot end having cutting surfaces for cutting a pilot hole and having land portions intermediate the cutting surfaces which will not engage the sidewalls of the pilot hole during the cutting operation.

To this end and in accordance with a feature of this invention, there is provided a drilling and thread forming screw comprising a trailing threaded shank and a pilot end, said pilot end having a transverse major axis and a transverse minor axis, the major axis being of greater length than the minor axis, a plurality of flutes extending longitudinally in the pilot end whereby to provide a plurality of cutting surfaces, said flutes being oriented such that said cutting surfaces lie generally along the plane defined by the major axis of said pilot end and are coterminal with said major axis whereby cutting edges associated with said cutting surfaces describe a circle having a greater diameter than said minor axis when said screw is rotated, drag surfaces formed by said flutes lying generally along said minor axis and coterminal therewith and lands intermediate said drag and cutting surfaces of increasing width from said drag surfaces to said cutting surfaces whereby said lands will not engage the sidewall of a pilot hole formed by said cutting surfaces.

The above and other features of the invention, together with various novel details of construction, will now be more particularly described with reference to the accompanying drawings and pointed out in the claims. It is to be understood that the particular embodiment of the invention shown in the drawings is for illustration purposes only and it not to be construed as a limitation of the invention.

Figure 3:
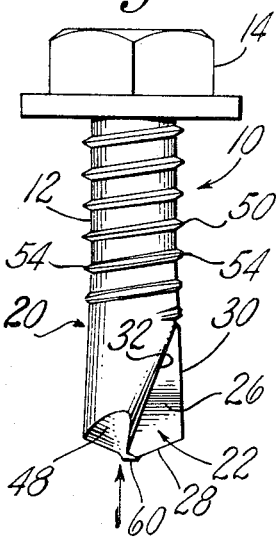
FIG. 3 is a side elevation of a completed metal screw which is formed by threading the screw blank shown in FIG. 2.

A preferred embodiment of the screw 10 of the invention is illustrated in FIGS. 3, 5, 6 and 7. As shown in FIG. 3, the screw 10 comprises an elongated shank 12 having a head section 14 integral with a trailing end thereof. The head section may be provided with any convenient, conventional means cooperative with a tool for turning the screw to effect insertion or withdrawal.

Figure 5:
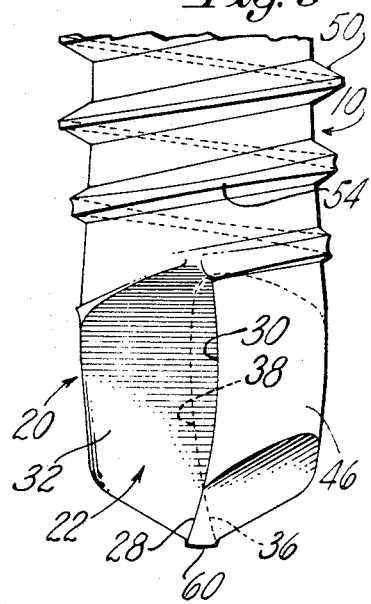
FIG. 5 is an enlarged view of the screw illustrated in FIG. 2 as viewed from a 90° angle.
Figures 6, 7:
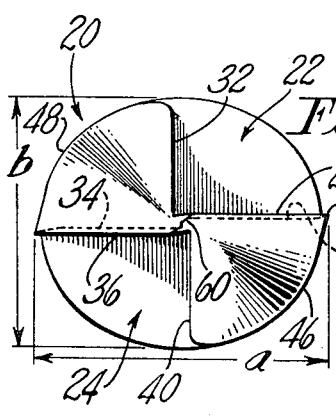
FIG. 6 is an end view of the entering portion or pilot end illustrated in FIGS. 3 and 5.
FIG. 7 is a perspective view of the pilot end of the screw shown in FIGS. 3, 5 and 6.

The screw 10 has a pilot end 20 of substantially elliptical transverse configuration as viewed in FIG. 6. The term elliptical is here used for purposes of description or visualization only and it is not intended in a strict mathematical sense. Longitudinally extending flutes or slots 22, 24 of similar construction are formed in opposite quadrants of the pilot end. The flute 22 is defined by a cutting surface 26 having cutting edges 28, 30 and by a drag surface 32. The flute 24 is defined by a cutting surface 34 having cutting edges 36, 38 and by a drag surface 40. The cutting surfaces 26 and 34 are, preferably, slightly arcuate and lie generally in a plane which has a small amount of angularity with respect to the longitudinal axis of the screw whereby to facilitate removal of material from the cutting edges during the cutting operation. The contour of the surfaces 26 and 34, as best seen in FIGS. 5 and 6, provides the proper cutting angle and rake at the cutting edges 28 and 36. The drag surfaces 32 and 40 are also angularly disposed with respect to the longitudinal axis of the screw to facilitate discharge of material removed in the cutting operation.

As most clearly indicated in FIG. 6, the maximum width of the cutting surfaces 26 and 34 is greater than the maximum width of the drag surfaces 32 and 40. That is, the cutting surfaces 26, 34 lie generally offset from and parallel to the transverse major axis *a* of the elliptical pilot end whereby essentially to define the major axis. The drag surfaces lie in a similar relation to the transverse axis *b*. Accordingly, a pilot hole cut by the cooperative action of the cutting edges 28, 30 and 36, 38 of the cutting surfaces 26 and 34, respectively will be of greater diameter than the minor axis *b* of the pilot end. Thus, the drag surfaces 32 and 40 which may be considered to define the minor axis *b* will not engage the sidewalls of a pilot hole cut by the cutting edges. Similarly, the arcuate portions of the pilot end intermediate the cutting and drag surfaces, hereinafter referred to as lands 46 and 48, will also not engage the sidewalls of a pilot hole. That is, the lands 46, 48 progress transversely in generally arcuate contour from a minimum radius at the drag surfaces to a maximum radius at the cutting surface. A difference of approximately 10% in the length of the major and minor axis has been found adequate to ensure clearance by the lands 46 and 48, and, accordingly, is preferred.

The construction just discussed thus provides a self cutting screw which may be used to cut a pilot hole by the application of substantially less driving torque than required to insert screws disclosed by the prior art. Frictional drag has been reduced to a minimum. The only frictional forces are those necessary to accomplish the cutting operation.

The lands 46 and 48, see particularly FIG. 7, are generally bulbous in longitudinal contour. This construction allows maximum reinforcement for the cutting surfaces 26 and 34 which essentially constitute a leading end of the lands. That is, the bulbous or convex contour of the lands permit the provision of a maximum amount of material to absorb the forces generated by the cutting operation and the maintenance of the elliptical configuration discussed above.

As best illustrated in FIG. 3, in the preferred embodiment the cutting edges 30 and 38 are tapered toward the trailing end of the screw. That is, the transverse major axis of the generally elliptical pilot end decreases in length in the direction of the trailing end. This also facilitates the escape of material removed during the cutting operation and decreases the effective cutting contact area whereby to minimize frictional drag.

Helical thread convolutions 50 are formed on the trailing portion of the shank 12. In the preferred embodiment, the major axis *a* of the generally elliptical pilot end 20 is of greater length than the root diameter of the threads on the shank 12, see particularly FIG. 3. Thus, the pilot end will cut a pilot hole of greater diameter than the root diameter of the shank 12. In the preferred embodiment, the transverse major axis of the pilot end has a maximum length at its widest point equal to approximately the root diameter plus one-half of the difference between the crest and root diameters. Thus, the pilot end cuts a pilot hole larger than is actually necessary. However, this size pilot hole permits the threads 50 to swage the material engaged by the crest portions of the threads into the voids proximate to the root diameter of the shank whereby to achieve complete contact of the threads 50 with the member in which the screw is inserted. This construction reduces the cutting or swaging which must be completed by the threads 50 and thereby reduces the required driving torque.

The elliptical configuration discussed in relation to the pilot end 20 extends to and includes that portion of the thread shank which comprises the first two threads adjacent the pilot end, i.e., in the preferred embodiment. Thus, the initial threading or tapping of the pilot hole is accomplished by what may be defined as lobes 54 spaced 180° apart on each of the first two threads. The lobes 54 are located at the major axis of the elliptical cross-section. That is, the portions of the first two threads at the minor axis have a larger land width and therefore a lower crest height than at the major axis. This is a result of practicing conventional threading procedure on the elliptical cross-section. Compare FIGS. 3 and 5 in this regard. This construction substantially reduces the driving torque required for insertion and improves the stripping qualities. The lobes 54 effect progressive internal threading of the pilot hole with a minimum frictional contact during the initial phase of thread forming.

The pilot end 20 is provided with a pointed tip 60 which aids in initial positioning and cutting. The tip 60 extends slightly in advance of the cutting edges 28, 36.

Figure 4:
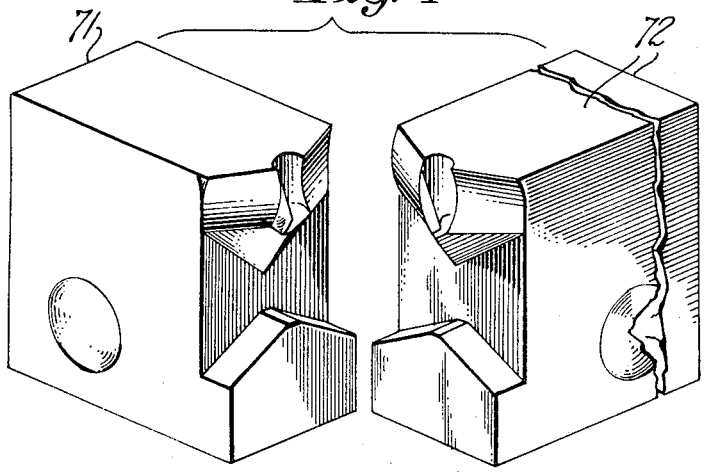
FIG. 4 is a perspective view of a pair of dies particularly constructed to perform the punching operation the results of which are shown in FIG. 2.

The novel screw structure described above readily could be produced by employing standard machining practices to mill the flutes 22 and 24, etc. However, as in other applications where such standard practices are used, the cost would be high. Applicant has developed a unique method of manufacturing his fastener by the utilization of novel dies 71, 72 shown in FIG. 4. A primary obstacle to the use of the dies 71, 72, however, is that if the dies are employed on a screw blank without preparatory treatment, the blank will be hardened and crack under the pressures generated in the use of the dies. That is, if a standard screw blank is exposed to the pinching or punching pressures exerted by the dies 71, 72, the blank will crack in the vicinity of the flutes 22, 24 and will be of otherwise poor quality.

Figure 1:
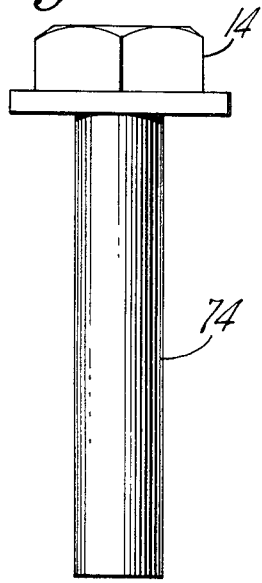
FIG. 1 is a side elevation of a metal screw blank prior to punching and threading.
Figure 2:
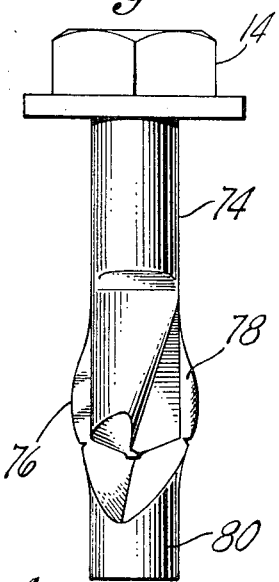
FIG. 2 is a side elevation of the screw blank following the pointing or punching operation and prior to the threading operation.

Applicant has found that if he anneals the screw blank, such as indicated by 74 of FIG. 1, he is able successfully to form a screw of excellent quality. The result of the use of the dies 71, 72 on the blank 74, in a manner to be hereinafter described, is shown in FIG. 2. The annealing operation lends sufficient ductility to permit the metal to flow whereby to form ears 76, 78 and a head 80 on the blank 74. The ductility of the blank 74 enables it to withstand the pressures of forming without cracking at the points of maximum stress. The ears 76, 78 and the head 80 remain integral with the blank 74 after the die-punching operation.

After the blank 74 is punched it is threaded in conventional manner. The ears 76, 78 and head 80 are removed during the threading operation by engagement with the threading instrumentalities. The ears 76, 78 and head 80 prevent abrasion of the cutting edges prior to the threading operation. If the ears 76, 78 or head 80 are broken off during the punching step; rough, but not sharp, cutting edges are produced.

Applicant's above-described novel method of pinching or punching the pilot end of a fastener permits the impartation of a variety of configuration thereto. The method may be used to produce self-cutting screws at a production rate heretofore impossible and at a lower unit cost.

The dies 71 and 72 are preferably used with the apparatus described in my copending application for Letters Patent of the United States Ser. No. 475,533, filed July 28, 1965.

Having thus described my invention, what I claim as new and desire to secure by Letters Patent of the United States is:

1. A drilling and thread forming screw comprising a trailing threaded shank and a pilot end, said pilot end having a transverse major axis and a transverse minor axis, the length of the major axis being substantially at least as great as the root diameter of the threaded shank and being approximately 10% greater than that of the minor axis, a pair of flutes extending longitudinally in the pilot end whereby to provide a pair of cutting surfaces, said flutes being oriented such that said cutting surfaces lie generally along the plane defined by the major axis of said pilot end and are coterminal with said major axis whereby cutting edges associated with said cutting surfaces describe a circle having a greater diameter than said minor axis when said screw is rotated, drag surfaces formed by said flutes lying generally along said minor axis and coterminal therewith, and lands intermediate said drag and cutting surfaces of increasing width in a radial direction from said drag surface to said cutting surfaces whereby said lands will not engage the sidewall of a pilot hole formed by said cutting surfaces.

2. A drilling and thread forming screw according to claim 1 wherein the lands have a generally bulbous longitudinal contour whereby to provide maximum strength to said cutting surfaces.

3. A drilling and thread forming screw according to claim 1 wherein the transverse major axis of the pilot end decreases in length along the longitudinal axis of the screw in the direction of the trailing shank whereby to facilitate the escape of material removed during cutting and to minimize frictional drag.

4. A drilling and thread forming screw according to claim 1 wherein the major transverse axis of the pilot end has a maximum length greater than the length of the root diameter of the thread shank whereby the pilot end will form a pilot hole of larger diameter than said root diameter thereby to minimize the cutting required in the thread cutting phase of screw insertion.

5. A drilling and thread forming screw according to claim 4 wherein the major transverse axis of the pilot end has a maximum length approximately equal to the root diameter plus one-half the difference between the crest and root diameters of the thread shank whereby the threads of the shank will swage material engaged by the crest portions of the threads during screw insertion into engagement with the root portions of the shank thereby to form internal threads of appropriate size.

6. A drilling and thread forming screw according to claim 1 wherein a leading portion of the threaded shank is of generally elliptical configuration having transverse major and minor axes corresponding to the transverse major and minor axes of the pilot end, said leading portion having a plurality of thread swaging lobes on the circumference of the shank at the termini of the major axis.

7. A drilling and thread forming screw comprising a trailing threaded shank and a pilot end, a leading portion of said shank adjacent said pilot end having a generally elliptical cross-section, said pilot end having a transverse major axis and a transverse minor axis coplanar with the transverse major and transverse minor axes of the generally elliptical portion of said shank, a pair of flutes extending longitudinally in the pilot end whereby to provide a pair of cutting surfaces, said flutes being oriented such that said cutting surfaces lie generally along the plane defined by the major axis of the pilot end and are coterminal with said major axis of the pilot end, the major axis of the pilot end being substantially at least as great as the root diameter of the threaded shank, drag surfaces formed by said flutes lying generally along said minor axis of the pilot end and coterminal therewith, and lands intermediate said drag and cutting surfaces of increasing width in a radial direction from said drag surfaces to said cutting surfaces, said lands generally corresponding in configuration to the configuration of that section of the generally elliptical portion of the shank located in the corresponding quadrant formed by the said coplanar major and minor axes throughout the major portion of the pilot end.

References Cited

UNITED STATES PATENTS

| | | | |
|---|---|---|---|
| 3,238,836 | 3/1966 | Johnson | 85—47 |
| 3,241,426 | 3/1966 | Gutshall | 85—47 |
| 3,318,182 | 5/1967 | Carlson | 85—41 |

EDWARD C. ALLEN, *Primary Examiner.*

R. S. BRITTS, *Assistant Examiner.*